United States Patent [19]
Li

[11] Patent Number: 6,082,513
[45] Date of Patent: Jul. 4, 2000

[54] CLUTCH DEVICE OF A MILLER

[76] Inventor: Kuo-Hao Li, 58, Ma Yuan West St., Taichung, Taiwan

[21] Appl. No.: 09/146,812

[22] Filed: Sep. 4, 1998

[51] Int. Cl.[7] .................................................. F16D 23/00
[52] U.S. Cl. .......................... 192/56.1; 409/194; 408/139; 474/86; 474/88; 474/148
[58] Field of Search ................................ 192/55.1, 56.1, 192/56.5; 409/187, 194; 464/35, 37; 408/139, 6; 474/84, 86, 87, 88, 2, 148, 150, 199, 902, 903; 74/3

[56] References Cited

U.S. PATENT DOCUMENTS 2,568,134  9/1951  Tharpe ....................... 474/86
3,688,522  9/1972  Schmuck ..................... 464/35
3,877,253  4/1975  Yeagle ....................... 464/35

*Primary Examiner*—Tamara L. Graysay
*Assistant Examiner*—Colby Hansen

[57] ABSTRACT

A clutch device has a shaft rod, a hollow torsion sleeve, a trip device, an outer toothed gear, an inner toothed gear, and a first belt pulley. The outer toothed gear is disposed on the trip device. The hollow torsion sleeve has a plurality of grooves. The trip device has a center hole to receive the hollow torsion sleeve, and a plurality of radiated thread holes. The inner toothed gear is disposed on the first belt pulley. The outer toothed gear engages with the inner toothed gear. Each radiated thread hole receives a ball, a spring, and a stud. Each groove receives the respective ball. The shaft rod is inserted through the hollow torsion sleeve, the first belt pulley, and a second belt pulley.

1 Claim, 4 Drawing Sheets

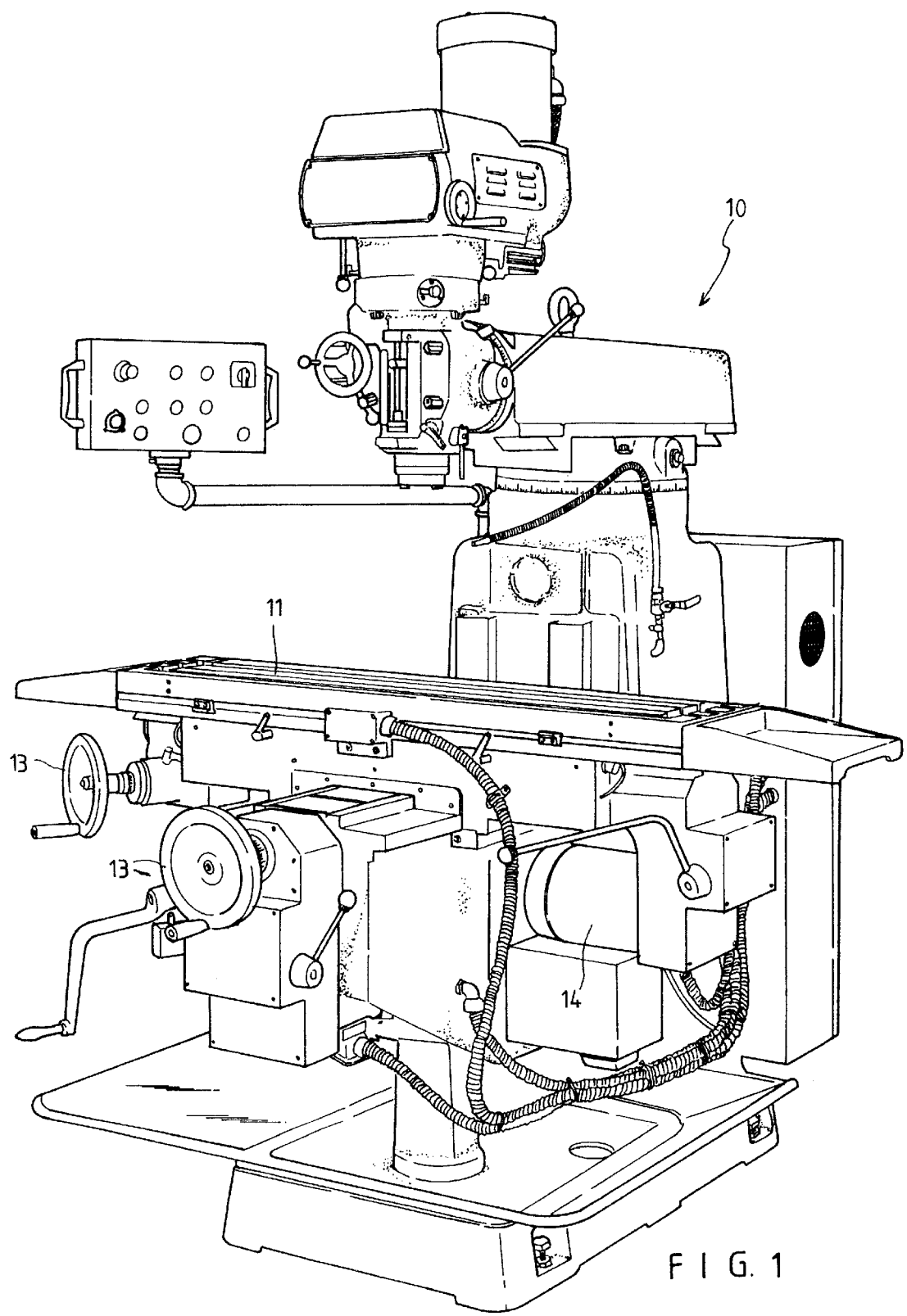
F I G. 1

CLUTCH DEVICE OF A MILLER

BACKGROUND OF THE INVENTION

The present invention relates to a clutch device of a miller. More particularly, the present invention relates to a clutch device which has a trip device.

A conventional miller does not have a trip device. When a drive shaft is checked, a motor will be overloaded. Therefore, the motor may be damaged.

SUMMARY OF THE INVENTION

An object of the present invention is to provide a clutch device which has a trip device to protect a motor while a drive shaft is checked.

Accordingly, a miller comprises a platform, a motor controlling the motion of the platform, and at least a hand wheel controlling the motion of the platform. The clutch device comprises a shaft rod, a hollow torsion sleeve, a trip device, an outer toothed gear, an inner toothed gear, and a first belt pulley. The outer toothed gear is disposed on the trip device. The hollow torsion sleeve has a plurality of grooves. The trip device has a center hole to receive the hollow torsion sleeve, and a plurality of radiated thread holes. The inner toothed gear is disposed on the first belt pulley. The outer toothed gear engages with the inner toothed gear. Each of the radiated thread holes receives a ball, a spring, and a stud. Each of the grooves receives the respective ball. The shaft rod is inserted through the hollow torsion sleeve, the first belt pulley, and a second belt pulley. An axle of the motor is inserted in a third belt pulley. The drive shaft is inserted in a fourth belt pulley. The motor drives the third belt pulley to rotate. A first belt surrounds the third belt pulley and the first belt pulley. The third belt pulley drives the first belt pulley to rotate. The first belt pulley drives the trip device, the hollow torsion sleeve, and the shaft rod to rotate. A second belt surrounds the second belt pulley and the fourth belt pulley. The shaft rod drives the second belt pulley to rotate. The second belt pulley drives the fourth belt pulley and the drive shaft to rotate. When the drive shaft is checked, the shaft rod and the hollow torsion sleeve are checked also. The ball and the spring are tripped so that the trip device rotates idly.

BRIEF DESCRIPTION OF THE DRAWINGS

FIG. 1 is a perspective view of a miller of a preferred embodiment in accordance with the present invention;

DETAILED DESCRIPTION OF THE INVENTION

Figure 2:
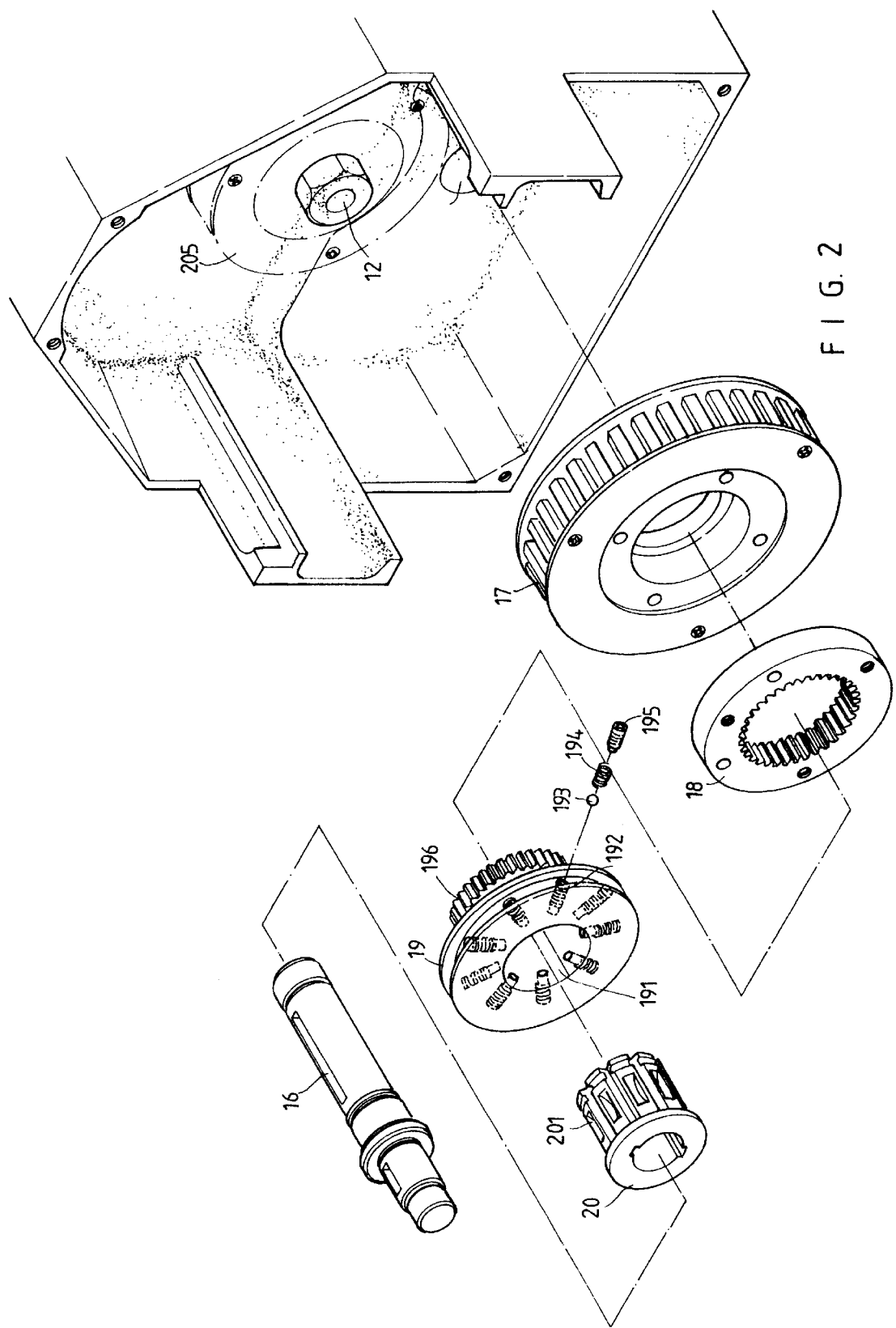
FIG. 2 is a perspective exploded view of a clutch device of a preferred embodiment in accordance with the present invention.

Referring to FIG. 1, a miller 10 comprises a platform 11, a motor 14 controlling the motion of the platform 11, and at least a hand wheel 13 controlling the motion of the platform 11.

Referring to FIGS. 1 to 3A, a drive shaft 12 is disposed in the miller 10. The motor 14 is disposed on the miller 10.

A clutch device comprises a shaft rod 16, a hollow torsion sleeve 20, a trip device 19, an outer toothed gear 196, an inner toothed gear 18, and a first belt pulley 17. The outer toothed gear 196 is disposed on the trip device 19. The hollow torsion sleeve 20 has a plurality of grooves 201. The trip device 19 has a center hole 191 to receive the hollow torsion sleeve 20, and a plurality of radiated thread holes 192. The inner toothed gear 18 is disposed on the first belt pulley 17. The outer toothed gear 196 engages with the inner toothed gear 18. Each of the radiated thread holes 192 receives a ball 193, a spring 194, and a stud 195. Each of the grooves 201 receives the respective ball 193. The shaft rod 16 is inserted through the hollow torsion sleeve 20, the first belt pulley 17, and a second belt pulley 202. An axle of the motor 14 is inserted in a third belt pulley 203. The drive shaft 12 is inserted in a fourth belt pulley 205.

Figure 3:
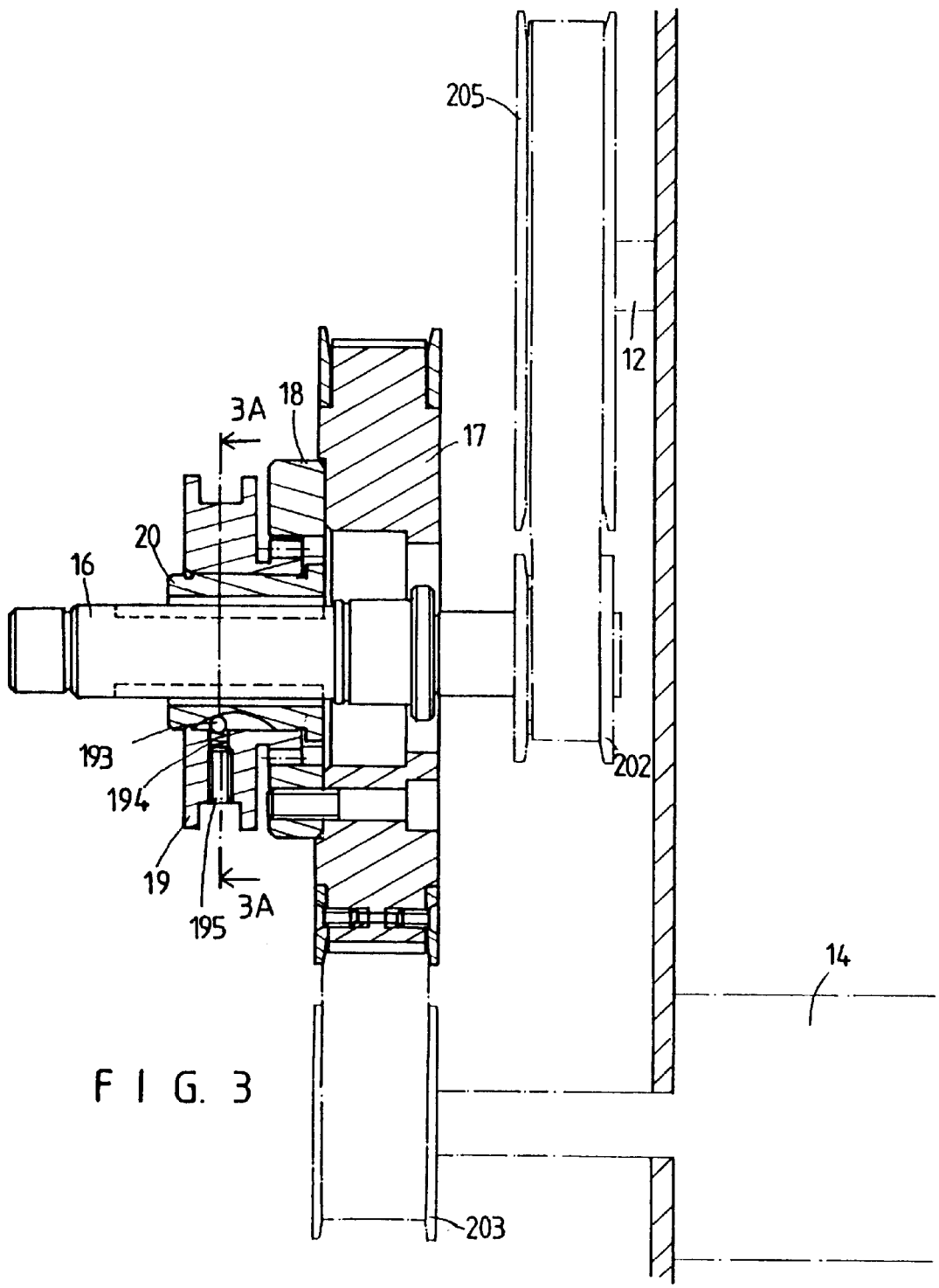
FIG. 3 is a sectional assembly view of a clutch device of a prefer embodiment in accordance with the present invention.
Figure 3A:
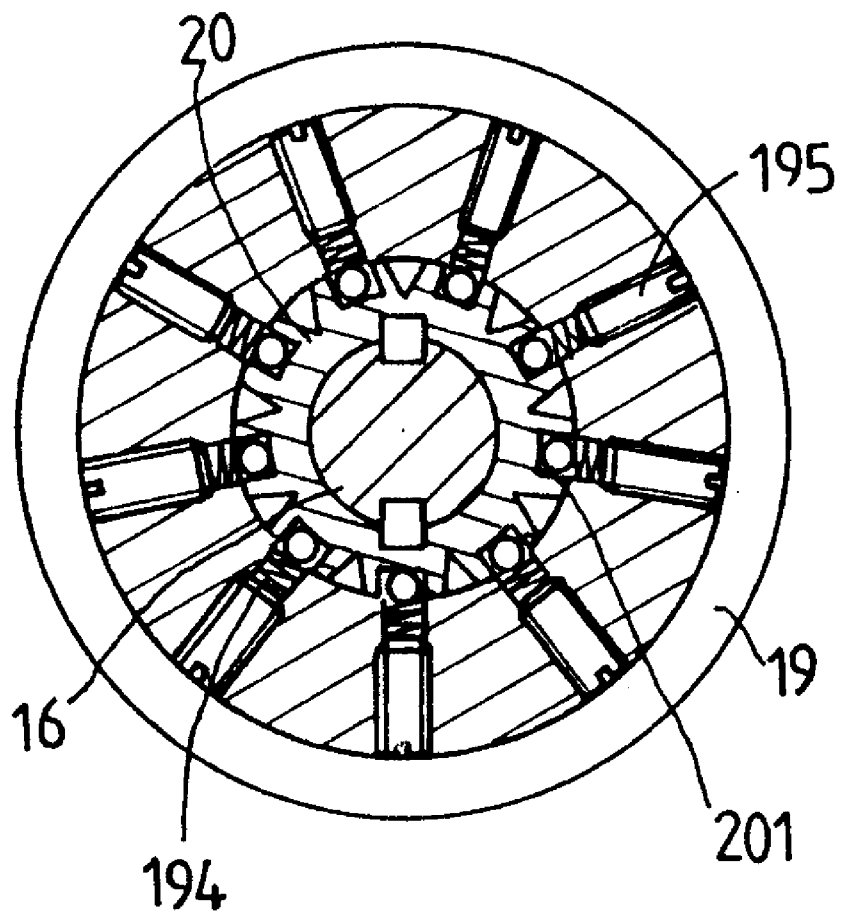
FIG. 3A is a sectional view taken along line 3A—3A in FIG. 3.

Referring to FIG. 3, the motor 14 drives the third belt pulley 203 to rotate. A first belt (not shown in the figure) surrounds the third belt pulley 203 and the first belt pulley 17. The third belt pulley 203 drives the first belt pulley 17 to rotate. The first belt pulley 17 drives the trip device 19, the hollow torsion sleeve 20, and the shaft rod 16 to rotate. A second belt (not shown in the figure) surrounds the second belt pulley 202 and the fourth belt pulley 205. The shaft rod 16 drives the second belt pulley 202 to rotate. The second belt pulley 202 drives the fourth belt pulley 205 and the drive shaft 12 to rotate.

When the drive shaft 12 is checked, the shaft rod 16 and the hollow torsion sleeve 20 are checked also. The ball 193 and the spring 194 are tripped so that the trip device 19 rotates idly.

Since the first belt pulley 17 still rotates while the drive shaft 12 is checked, the motor 14 will not be damaged.

The present invention is not limited to the above embodiment but various modification thereof may be made. Furthermore, various changes in form and detail may be made without departing from the scope of the present invention.

What is claimed is:

1. A clutch device comprising:

a shaft rod, a hollow torsion sleeve, a trip device, an outer toothed gear, an inner toothed gear, and a first belt pulley, the outer toothed gear disposed on the trip device, the hollow torsion sleeve having a plurality of grooves, the trip device having a center hole to receive the hollow torsion sleeve, and a plurality of radiated thread holes, the inner toothed gear disposed on the first belt pulley, the outer toothed gear engaging with the inner toothed gear, each of the radiated thread holes receiving a ball, a spring, and a stud, each of the grooves receiving the respective ball, the shaft rod inserted through the hollow torsion sleeve, the first belt pulley, and a second belt pulley, an axle of a motor inserted in a third belt pulley, a drive shaft inserted in a fourth belt pulley, a motor driving the third belt pulley to rotate, a first belt surrounding the third belt pulley and the first belt pulley, the third belt pulley driving the first belt pulley to rotate, the first belt pulley driving the trip device, the hollow torsion sleeve, and the shaft rod to rotate, a second belt surrounding the second belt pulley and the fourth belt pulley, the shaft rod driving the second belt pulley to rotate, the second belt pulley driving the fourth belt pulley and the drive shaft to rotate, when the drive shaft, the shaft rod, and the hollow torsion sleeve are checked, the ball and the spring are tripped so that the trip device rotates idly.

* * * * *